(12) United States Patent
Newnham

(10) Patent No.: US 10,304,070 B2
(45) Date of Patent: May 28, 2019

(54) SYSTEMS AND METHODS FOR REWARD PREDICTION AND OFFER SELECTION

(71) Applicant: NICE-SYSTEMS LTD., Ra'anana (IL)

(72) Inventor: Leonard Michael Newnham, Calvert (GB)

(73) Assignee: NICE Ltd., Ra'anana (IL)

( * ) Notice: Subject to any disclaimer, the term of this patent is extended or adjusted under 35 U.S.C. 154(b) by 699 days.

(21) Appl. No.: 14/796,182

(22) Filed: Jul. 10, 2015

(65) Prior Publication Data

US 2017/0011414 A1   Jan. 12, 2017

(51) Int. Cl.
  *G06Q 30/00* (2012.01)
  *G06Q 30/02* (2012.01)
  *G06N 5/02* (2006.01)

(52) U.S. Cl.
  CPC .......... *G06Q 30/0211* (2013.01); *G06N 5/02* (2013.01); *G06Q 30/0239* (2013.01)

(58) Field of Classification Search
  CPC ... G06N 5/02; G06Q 30/0211; G06Q 30/0239
  See application file for complete search history.

(56) References Cited

U.S. PATENT DOCUMENTS

| | | | |
|---|---|---|---|
| 9,467,567 B1 * | 10/2016 | Barkan | H04M 3/51 |
| 2011/0184778 A1 * | 7/2011 | Graepel | G06N 7/005 705/7.31 |
| 2012/0271612 A1 * | 10/2012 | Barsoum | G06F 19/00 703/11 |
| 2012/0303598 A1 | 11/2012 | Newnham et al. | |
| 2012/0303621 A1 | 11/2012 | Newnham et al. | |
| 2013/0024405 A1 | 1/2013 | Newnham et al. | |
| 2013/0080358 A1 | 3/2013 | Newnham et al. | |
| 2013/0080377 A1 | 3/2013 | Newnham et al. | |
| 2013/0110750 A1 | 5/2013 | Newnham et al. | |
| 2014/0114891 A1 | 4/2014 | Newnham et al. | |
| 2015/0100526 A1 | 4/2015 | Newnham et al. | |
| 2016/0189176 A1 | 6/2016 | Newnham | |
| 2016/0292706 A1 | 10/2016 | Newnham et al. | |
| 2017/0094058 A1 | 3/2017 | Piaggio et al. | |

OTHER PUBLICATIONS

U.S. Appl. No. 14/985,533, filed Dec. 31, 2015, Bellosi et al.

* cited by examiner

*Primary Examiner* — Mario C. Iosif
(74) *Attorney, Agent, or Firm* — Pearl Cohen Zedek Latzer Baratz LLP

(57) ABSTRACT

Methods and systems predict a reward resulting from serving one of a set of offers to one or more potential respondents, for example via a webpage, using one or more processors to calculate a predicted reward according to a model. The model may include one or more variables characterizing the respondent, a set of offer-specific coefficients comprising at least one coefficient for each of said one or more variables for each offer, and a set of common coefficients comprising a separate coefficient for each of said one or more variables, each coefficient of said set of common coefficients being common to all of said offers. The model may be trained in a two stage update process including a first update operation updating at least one common coefficient and a second update operation updating at least one offer-specific coefficient.

16 Claims, 12 Drawing Sheets

| Status | Name | Campaigns | Locations | Campaign Media | Media Size | Item Type |
|---|---|---|---|---|---|---|
| active | Demo Data-Option 01 | Demo Data-CAM 100 | Demo Data-LOC 100 | | | |
| active | Demo Data-Option 02 | Demo Data-CAM 100 | Demo Data-LOC 100 | | | |
| active | Demo Data-Option 03 | Demo Data-CAM 100 | Demo Data-LOC 100 | | | |
| active | Demo Data-Option 04 | Demo Data-CAM 100 | Demo Data-LOC 100 | | | |
| active | Demo Data-Option 05 | Demo Data-CAM 100 | Demo Data-LOC 100 | | | |

FIG. 7

SYSTEMS AND METHODS FOR REWARD PREDICTION AND OFFER SELECTION

FIELD OF THE INVENTION

The present invention is in the field of serving offers to individuals, for example via the internet to users of web browsers. In particular, some embodiments of the invention are in the specific field of serving targeted offers, for example offers that are aimed at a particular group of respondents. A decision to serve an offer may be made automatically in real time and may utilize machine learning techniques to build and continuously improve a mathematical model used to predict which of a number of available offers an individual is most likely to respond to.

BACKGROUND OF THE INVENTION

The following are definitions of terms used in this description and in the field to which the invention relates:

The term "offer" is used herein to denote one of a number of alternatives available for presentation to a potential respondent. Examples of offer include but are not limited to offers for sale of a product or service, or offers ancillary to an offer for sale such as a "buy one get one free" promotion or special price.

"Respondent", or potential respondent usually refers to a person or individual who is expected to respond to an offer. An example of a respondent is a potential customer for a product or service that is being promoted via an offer.

"Responses" can be in various forms and at various levels. Thus examples of responses include "clicks" on a link on a web page, purchase of a product or other acquisition, e.g., within a predetermined time period, and a yes (or no) answer to a question posed or sentence read by a call center operator. These are not limiting examples and others will be apparent to those skilled in the art. Sometimes the term "response" is used to denote a positive response, for example in situations where a negative response to an offer is possible. It should also be noted that responses can be Boolean (e.g., for a betting website, whether or not a bet was made), integer (e.g., number of bets made) or real (e.g., total value of bets made).

An offer is said to be "served" to a potential respondent. The serving of an offer may take the form of presentation of a web page, in which case it is commonly referred to as an "impression". The serving of an offer may take the form of display in a part of a web page, for example designed to improve the sales of products or services being promoted via the web page. Other examples of serving of an offer include but are not limited to reading a piece of text (script) to a caller, playing a piece of music such as an advertising jingle and mailing a flyer or advertising material, e.g., in paper form. A party serving an offer, or on whose behalf the offer is served, for example the party whose products or services are being promoted, may have available to it a number of different offers available to be served to a respondent, the selection of which may be according to one or more characteristics of the respondent.

"Response rate" is usually measured as ratio of responses to serves of a particular offer, but can also be measured in terms of number of responses in a unit time period, for example if the rate of serve is relatively stable. Number of serves and time period can be considered to be equivalent. Response rate can also be determined as a ratio of positive responses to serves, where negative responses are possible, or a ratio of positive responses to a total of non-responses plus negative responses.

"Standard error" StdErr is a well-known statistical parameter and may be used for example as a measure of confidence in a calculation. Where several calculations are performed a standard deviation may be determined, with the standard error being related to the standard deviation StdDev by the equation: $StdErr=Stdev/sqrt(n)$, where n represents the number of calculations used to determine the standard deviation. Thus the standard error decreases as sample size increases.

A "reward" is the hoped-for response to an offer. It may be as simple as a click on an item on a web-page, or it may be measured in monetary terms such as the profit derived from a customer making a purchase in response to an offer.

"Uplift" refers to the additional profit generated by the serving of an offer, above what would have been expected had the offer not been served. Thus, for example, if a product is offered at a special price and is bought by the respondent, and the respondent would not have bought the product at the normal price, the profit on the product is uplift. If the respondent would have bought the product anyway, the resulting uplift is negative. Uplift may be measured by splitting the population into two groups. One group receives a treatment, e.g., an offer, and the other is the control. The ratio of responses or rewards received between these groups is the uplift.

SUMMARY OF THE INVENTION

Some embodiments of the invention provide methods and systems for predicting a reward resulting from serving one of a set of offers to one or more potential respondents by using one or more processors to calculate a predicted reward according to a model. The model may include one or more variables characterizing the respondent, a set of offer-specific coefficients comprising at least one coefficient for each of said one or more variables for each offer, and a set of common coefficients comprising at least one coefficient for each of said one or more variables, each coefficient of said set of common coefficients being common to all of said offers. It should be noted that different coefficients may have the same value.

The use of the common coefficients according to some embodiments of the invention enables the model to more accurately represent real world scenarios in which it might be used.

A variable may have one of a number of possible values. Thus, according to some embodiments of the invention, there may be one offer-specific coefficient for every offer-variable-value combination and there may be one common coefficient for every variable-value combination. The possible values for variables are sometimes referred to as "bins" so that there is one "bin" for each value. Thus, for example, age may be binned: 0-20, 21-40, 41-60 and 60+. A variable may be independent, such as income or age, or it may depend on one or more other variables.

Some embodiments of the invention further comprise training the model so that it learns from experience and gradually represents real world scenarios more accurately, for example by updating or incrementing one or more of the coefficients. The training may comprise at least first and second update operations. For example, a first update operation may be applied to only common coefficients, and one or more updated common coefficients may be used in a second update operation in which offer-specific coefficients are updated.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 7 shows a screen shot such as might be shown to a user during system configuration according to some embodiments of the invention;

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Figure 1:
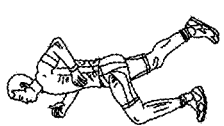
FIG. 1 shows a screen shot from a user interface via which an offer may be served to a respondent according to some embodiments of the invention.

FIG. 1 shows a screen shot 100 from a user interface via which an offer may be served to a respondent according to some embodiments of the invention. A part of the screen is made available for a selected offer to be presented. A set of possible offers 120 that may populate screen area is shown on the right. Some embodiments of the invention relate to the manner in which one of the offers 120 is selected for serving.

Methods of selecting an offer to be served according to some embodiments of the invention will be described with reference to FIGS. 1 to 5. Systems according to some embodiments of the invention in which these methods may be implemented will be described with reference to FIGS. 6 to 12.

In order to determine which is the best offer to serve, e.g., display to a particular respondent, a system according to some embodiments of the invention may "score" each of the available offers 120 against what is known about that respondent. The knowledge of the respondent may comprise a value for one or more variables characterising the respondent such as age, nationality, height, etc. The score may be in terms of a predicted reward resulting from the serving of the offer. For example, the system may predict the value in monetary terms of displaying each offer to that particular respondent. For example, if there are 3 offers, A, B and C, then the system may predict that a display of A is worth $500, a display of B: $520 and a display of C: $480. The system will then usually display B.

A problem in automated targeting is that the influence of serving a single offer frequently only has a relatively small effect on the respondent's future actions compared to what the respondent would do anyway. In the above example, displaying offer B is 4% better than average, a very good uplift in dollar terms but small enough that statistical noise can make it hard to realize.

Figure 2:
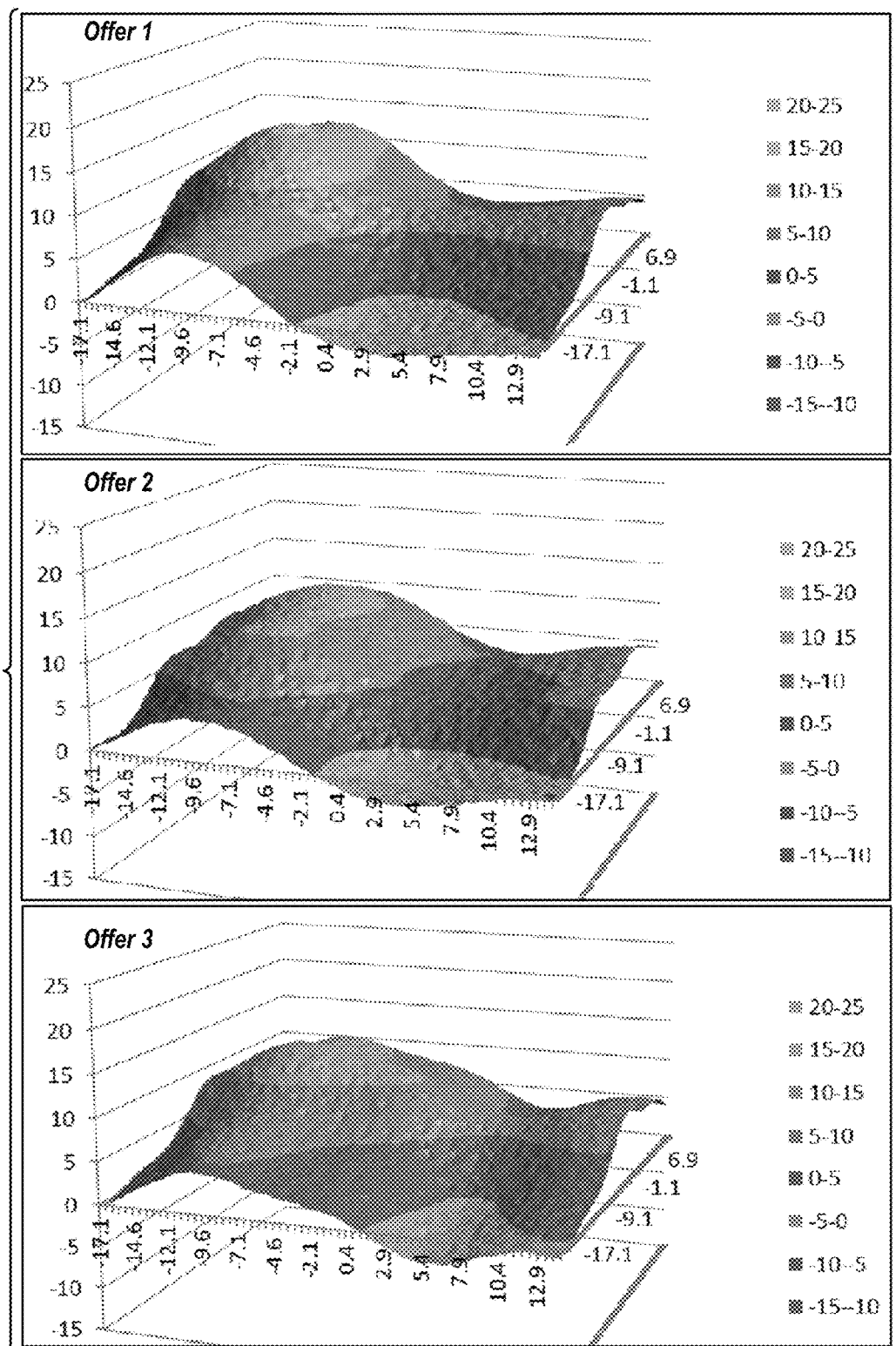
FIG. 2 is a set of graphs showing example response models for three different offers according to some embodiments of the invention.

Traditional response modeling will learn one model for each of the available offers. For a particular respondent, all models are scored, and the highest score is used to choose the best offer. The problem is that these models will each learn the same base behavior of whether an individual will respond at all. On top of this, each model will learn the minor variations that allow the system to discriminate between offers. This is illustrated in FIG. 2, which shows example response models for 3 offers. The x and y-axes represent two variables. The z-axis is the predicted reward. Each model is broadly similar with minor variations. It is only these minor variations that allow discrimination between the offers and hence targeting.

In the example of FIG. 2, the same base behavior is learned independently several times. This base behavior generally has a much larger magnitude than the magnitude of the variation between them. Consequently, small errors in learning the base behavior can easily drown out the differences between offers that it is desired to learn, hence making targeting inaccurate.

It is known in uplift modeling to segment respondents who are potential customers for a product or service into four groups as follows: Uplift Modeling segments customers into 4 groups:

The Persuadables: customers who respond to the marketing action only because they were targeted The Sure Things: customers who would have responded whether or not they were targeted The Lost Causes: customers who will not respond irrespective of whether or not they are targeted The Do Not Disturbs or Sleeping Dogs: customers who are less likely to respond because they were targeted Uplift modeling attempts to model the behavior of these groups explicitly.

The only segment that provides opportunity for uplift from individual targeting is the Persuadables. It is this group for which accurate modeling would be particularly advantageous. The rest are noise, with Sure Things contributing the most. Typically, as a group, the Sure Things signal will be many times larger than the Persuadables, and this relative size difference is the reason for the common shape in FIG. 2.

Figure 3:
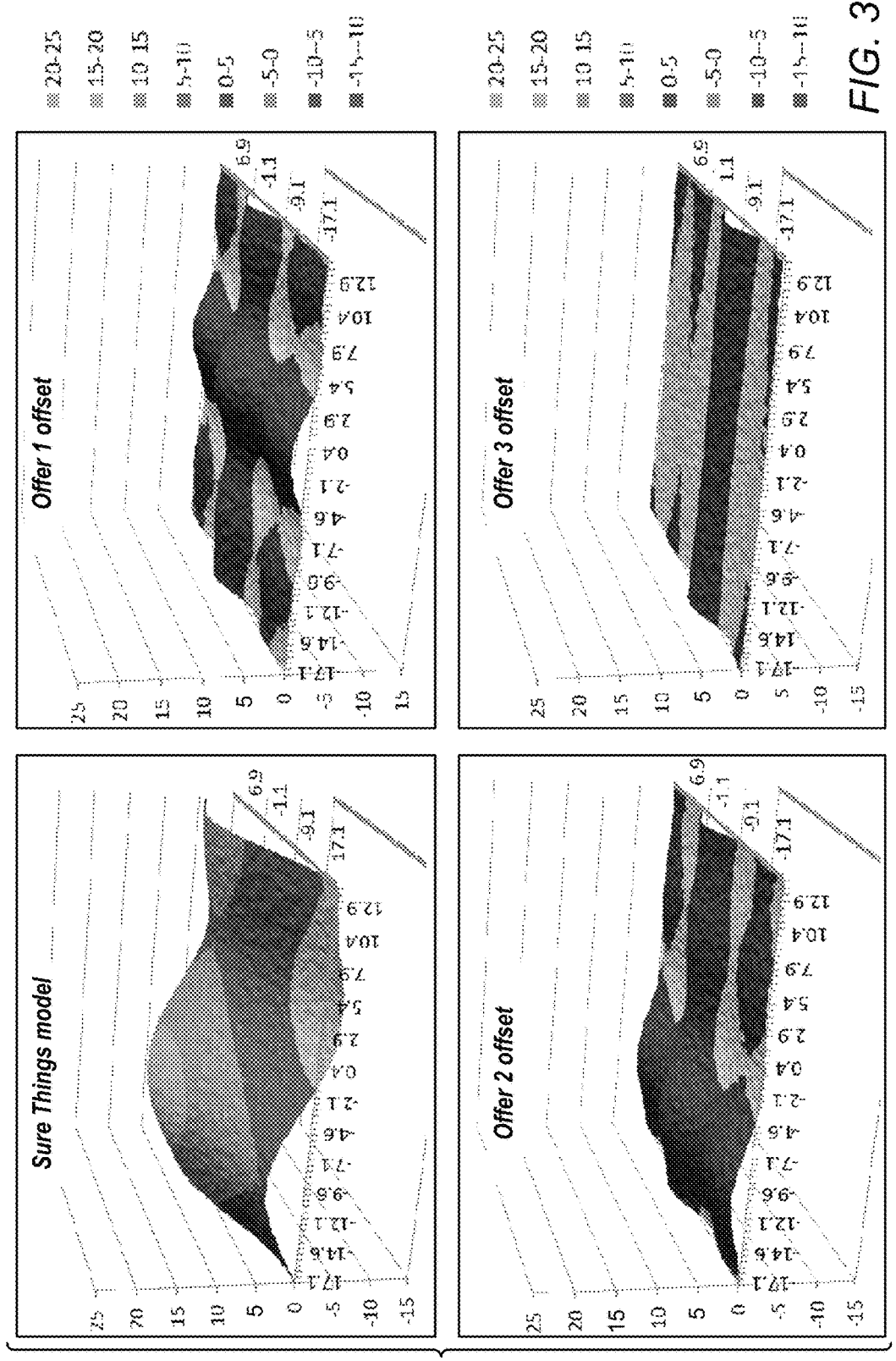
FIG. 3 is a set of graphs in which the first is a single model and the other three correspond to the three respective offers of FIG. 2 represented as an offset from the first model, according to some embodiments of the invention.

It would be useful to learn the behavior of the Sure Things just once and then learn offsets for each offer. This is illustrated in FIG. 3 which is a set of graphs, the first being a single model for the Sure Things and the other three being models for three respective offers represented as an offset from the first model. In practice, the models of FIG. 3 are not easy to determine. In general, only one offer is served to each customer. It is not possible to determine with certainty how an individual would have responded if he/she had been served a different offer and hence to which group he/she belongs. If this information was available, it would be possible to determine easily which respondents were the Sure Things and which were the Persuadables and build models appropriately. Without this information, this cannot be done directly. It should also be noted that learning is ideally a continuous process whereby a model is regularly updated to take account of evolving or changing conditions, so that the model for the Sure Things should adapt along with the model for the Persuadables. The learning may be an iterative process in which at each iteration one or more coefficients used in the model to predict an outcome, e.g., reward, is updated according to an actual outcome with the intention that the next prediction is more accurate.

Some embodiments of the invention aim to mitigate this problem through the use of an improved model and/or a multiple stage function for updating of the model. Together the improved model and the update function by which the model learns lead to a set of models for each offer that is more like those shown in FIG. 3 than those shown in FIG. 2.

A mathematical model used to predict the reward resulting from serving a particular offer to a respondent may be represented by a set of coefficients, otherwise known as weights. Imagine the following simple scenario:

3 offers:
    offer-1, offer-2 and offer-3
2 variables, each with only 2 possible values
    Income, possible values: {high, low}
    Age, possible values: {<40, >=40}

Using a minimal set of coefficients, this simple model may be represented by table 1:

TABLE 1

Simple set of coefficients to represent 3 offers and 2 binary variables

| variable | value | offer 1 | offer 2 | offer 3 |
|---|---|---|---|---|
| Income | High | 0.23 | 0.19 | 0.20 |
|  | Low | 0.17 | 0.19 | 0.15 |
| Age | >=40 | 0.18 | 0.15 | 0.18 |
|  | <40 | 0.17 | 0.19 | 0.17 |

Table 1 shows a simple set of coefficients to represent three offers and two independent variables, income and age. It is populated with example coefficients that have been obtained using a trained model. Here, there are separate coefficients for each of the offers and for each value of each of the variables. In other words, each variable-value-offer combination has a weight or coefficient. Some of the coefficients may have the same value, as shown in the table. The coefficients may be referred to as offer coefficients since they are specific to each offer.

The prediction for a particular customer for a particular offer may be calculated by simply adding up the appropriate coefficients. So, the prediction for a customer with high income and older than 40, for each offer is:

$$pred_1 = 0.23 + 0.18 = 0.41$$

$$pred_2 = 0.19 + 0.15 = 0.34$$

$$pred_3 = 0.20 + 0.18 = 0.38$$

The highest prediction is for offer 1. Thus, a system operating according to this model would generally choose offer 1 to display to this particular customer. It will be noted that, although the values of the coefficients are all relatively large, the difference in predictions between offers is small. Hence, small errors in these coefficients can result in a sub-optimal offer being chosen.

According to some embodiments of the invention, an extra or second set of coefficients is introduced. This extra set of coefficients is intended to represent the shared or common behavior across all offers. These extra coefficients may be referred to as variable-bin-bias coefficients, or simply bias coefficients. Each coefficient of this second set of coefficients may be common to all of the offers.

Table 2 represents the same model modified by the inclusion of an extra set of coefficients, the variable-value-bias coefficients, shown in italics, which are common to all offers.

TABLE 2

Set of coefficients containing Variable-Bias coefficients

|  |  |  | offer | | |
| --- | --- | --- | --- | --- | --- |
| variable | value | Bias | 1 | 2 | 3 |
| Income | High | 0.20 | 0.03 | −0.01 | 0.00 |
|  | Low | 0.17 | 0.00 | 0.02 | −0.02 |
| Age | >=40 | 0.17 | 0.01 | −0.02 | 0.01 |
|  | <40 | 0.18 | −0.01 | 0.01 | −0.01 |

The predicted reward for a particular customer for a particular offer may be calculated, as in the example of Table 1, by adding up all the appropriate coefficients. So, using this model the prediction for a customer with high income and older than 40 for each offer is:

$$pred_1 = 0.20 + 0.03 + 0.17 + 0.01 = 0.41$$

$$pred_2 = 0.20 - 0.01 + 0.17 - 0.02 = 0.34$$

$$pred_3 = 0.20 + 0.00 + 0.17 + 0.01 = 0.38$$

It will be noted that the coefficients of the second set, or bias coefficients, are relatively large compared to the coefficients of the first set. These coefficients are common to all offers and encode the behavior of the Sure Things.

The coefficients of the first set, the offer specific coefficients, are relatively small and encode the behavior of the Persuadables. The use of the bias coefficients may ensure that any error learning the Sure Things signal will not interfere with the learning of the Persuadables behavior.

The learning process or training of the model according to embodiments of the invention involves updating the model, e.g., one or more of the coefficients, based on the actual behavior of the respondents, e.g., following receipt of a reward notification which may indicate the value of the reward. The serving of offers and the receipt of reward notifications may be asynchronous, and there is not necessarily a one-to-one correspondence between serves and reward notifications. A reward notification may identify the offer to which it relates and/or the values of the variables characterizing the respondent so that a system according to some embodiments of the invention can update the appropriate coefficient(s). Alternatively, a reward may simply be credited to the last offer served to that respondent. Alternatively, credit could be distributed over all previous serves to that respondent, using any chosen arbitrary distribution function.

As well as using additional coefficients, some embodiments of the invention may also use a multi-stage update function for the training of the model. Thus, according to some embodiments of the invention, each iteration of updating one or more coefficients is performed in two or more stages. If all of the coefficients are updated in one stage, it is possible that the error will be spread across both bias and offer coefficients, and the Sure Things signal will not be isolated as desired. According to some embodiments of the invention, the updating is performed in two stages to produce the desired separation.

A one-stage update function may operate as follows:
a. Calculate error as error=actual reward received−predicted reward b. Adjust the contributing coefficients by sharing a small fraction, alpha, of the error amongst contributing coefficients. Alpha may be referred to as the learning rate.

The adjustment of the contributing coefficients changes the model to produce a slightly more accurate prediction next time

EXAMPLE

Customer with high income and older than 40 who is served offer 1. Bold text in table 3 indicates the contributing coefficients 0.23 and 0.18 which we call $c_1$ and $c_2$.

TABLE 3

Contributing coefficients for an update of a prediction of offer 1 for a high income, age >=40 customer, using the simple coefficient set

|  |  | offer | | |
| --- | --- | --- | --- | --- |
| variable | value | 1 | 2 | 3 |
| Income | High | 0.23 | 0.19 | 0.20 |
|  | Low | 0.17 | 0.19 | 0.15 |
| Age | >=40 | 0.18 | 0.15 | 0.18 |
|  | <40 | 0.17 | 0.19 | 0.17 |

Let actual reward received=1
Set alpha=0.01 (this is a typical value), then
From table 1 the prediction=0.23+0.18=0.41 error=1−0.41=0.59 delta=0.01*0.59=0.0059

As there were two contributing coefficients, then each is incremented by delta/2=0.003, as follows:

$$c_1 \leftarrow c_1 + 0.003 = 0.233$$

$$c_2 \leftarrow c_2 + 0.003 = 0.183$$

A two stage update function may operate as follows:
1. Update bias coefficients only by
   a. Calculating predicted response using bias coefficients only
   b. Adjusting the bias coefficients only by sharing a small fraction alpha, of the error amongst the bias coefficients only
      This absorbs as much of the error as possible into the bias coefficients
2. Update offer coefficients by
   a. Calculating predicted response using all the current values for the coefficients after the first stage, in other words the offer coefficients and the updated bias coefficients
   b. Sharing a small fraction, alpha, of this second error amongst all coefficients Each stage may use a standard update function on a subset of the coefficients. Over time, only the residual error, which cannot be accounted for by the bias coefficients, will be spread amongst the offer coefficients.

Example: as before,

Customer with high income and older than 40 who is served offer 1. Bold text in table 4 indicates the contributing coefficients. The two bias coefficients 0.20 and 0.17 are referred to as $c_{1,bias}$ and $c_{2,bias}$ and the two offer coefficients are referred to as $c_{1,offer}$ and $c_{2,offer}$.

TABLE 4

Contributing coefficients for an update of a prediction of offer 1 for a high income, age >=40 customer, using variable -bias coefficients

| | | | offer | | |
|---|---|---|---|---|---|
| variable | value | bias | 1 | 2 | 3 |
| Income | High | 0.20 | 0.03 | −0.01 | 0.00 |
| | Low | 0.17 | 0.00 | 0.02 | −0.02 |
| Age | >=40 | 0.17 | 0.01 | −0.02 | 0.01 |
| | <40 | 0.18 | −0.01 | 0.01 | −0.01 |

Let actual reward received=1
Set alpha=0.01, then
Stage 1
From table 2 the prediction using bias coefficients only=0.20+0.17=0.37 error=1−0.37=0.63 delta=0.01*0.63=0.0063

As there were two contributing coefficients, then each is incremented by delta/2, as follows:

$c_{1,bias} <- c_{1,bias} +0.0032=0.2032$ $c_{2,bias} <- c_{2,bias} +0.0032=0.1732$ Stage 2
From table 2 and stage 1 the prediction using all coefficients=0.2032+0.03+0.1732+0.01=0.4164 error=1−0.4164=0.5836 delta=0.01*0.5836=0.0058

As there were 4 contributing coefficients, then each is incremented by delta/4, as follows:

$c_{1,bias} <- c_{1,bias} +0.0015=0.2032+0.0015=0.2047$ $c_{2,bias} <- c_{2,bias} +0.0015=0.1732+0.0015=0.1747$ $c_{1,offer} <- c_{1,offer} +0.0015=0.0315$ $c_{2,offer} <- c_{2,offer} +0.0015=0.0115$ In this example the bias coefficients are updated twice for each iteration of the update process and the offer coefficients are updated once.

Thus, according to some embodiments of the invention, at each iteration of updating the model, multiple coefficients are updated in two stages. An update iteration may occur each time a reward occurs, and only the coefficients used to predict that reward are updated. Alternatively, it may be scheduled to occur at specific times, whether or not a reward occurs. In a first stage, only coefficients common to all offers are updated. In the second stage, other coefficients are updated. The second stage may include predicting the reward using the updated common coefficients from the first stage. The second stage may include updating again the common coefficients.

Figure 4:
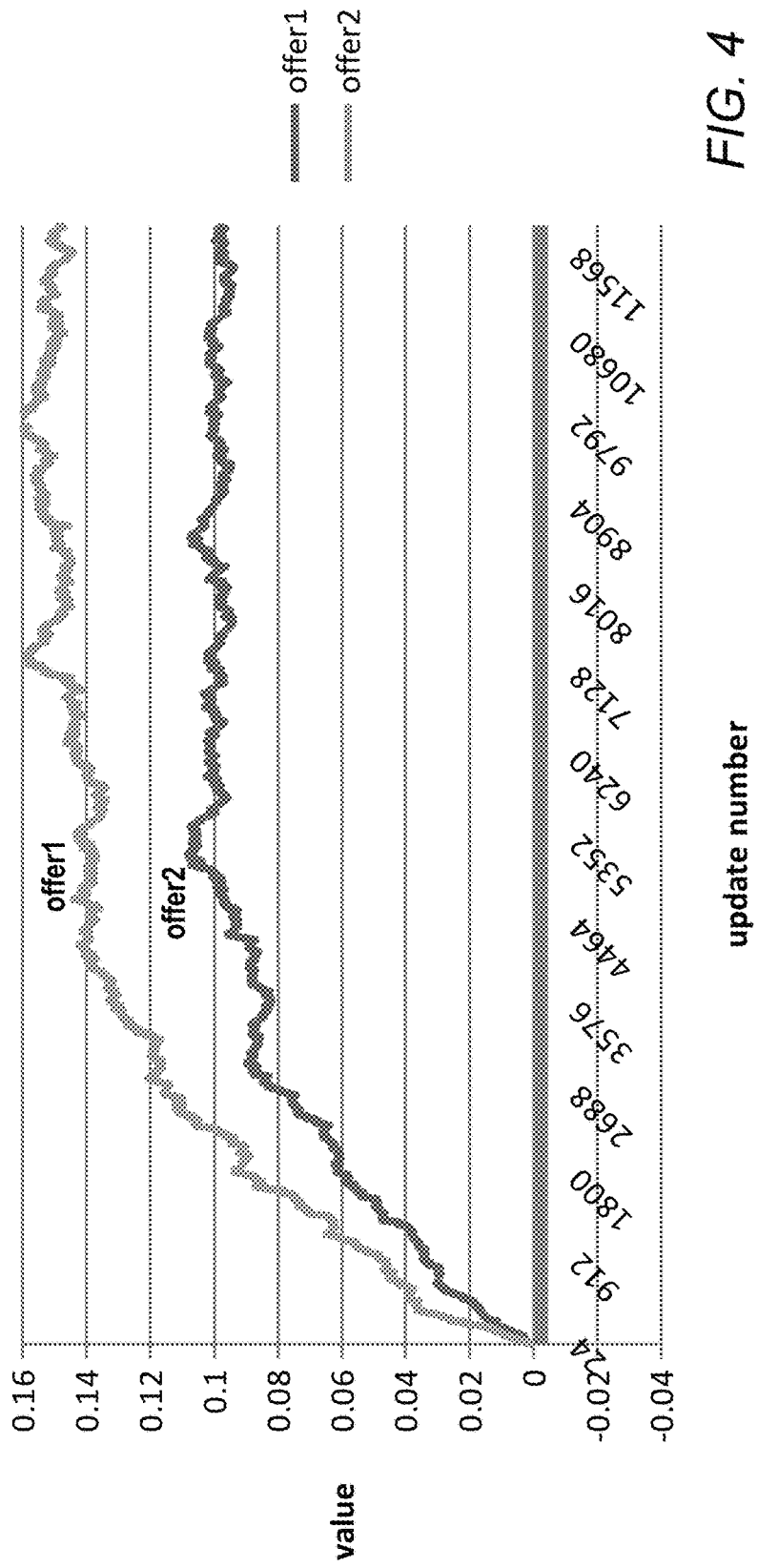
FIG. 4 is a graph showing the convergence of coefficient values for a one-stage update function with a scenario using one coefficient per offer, according to some embodiments of the invention.
Figure 5:
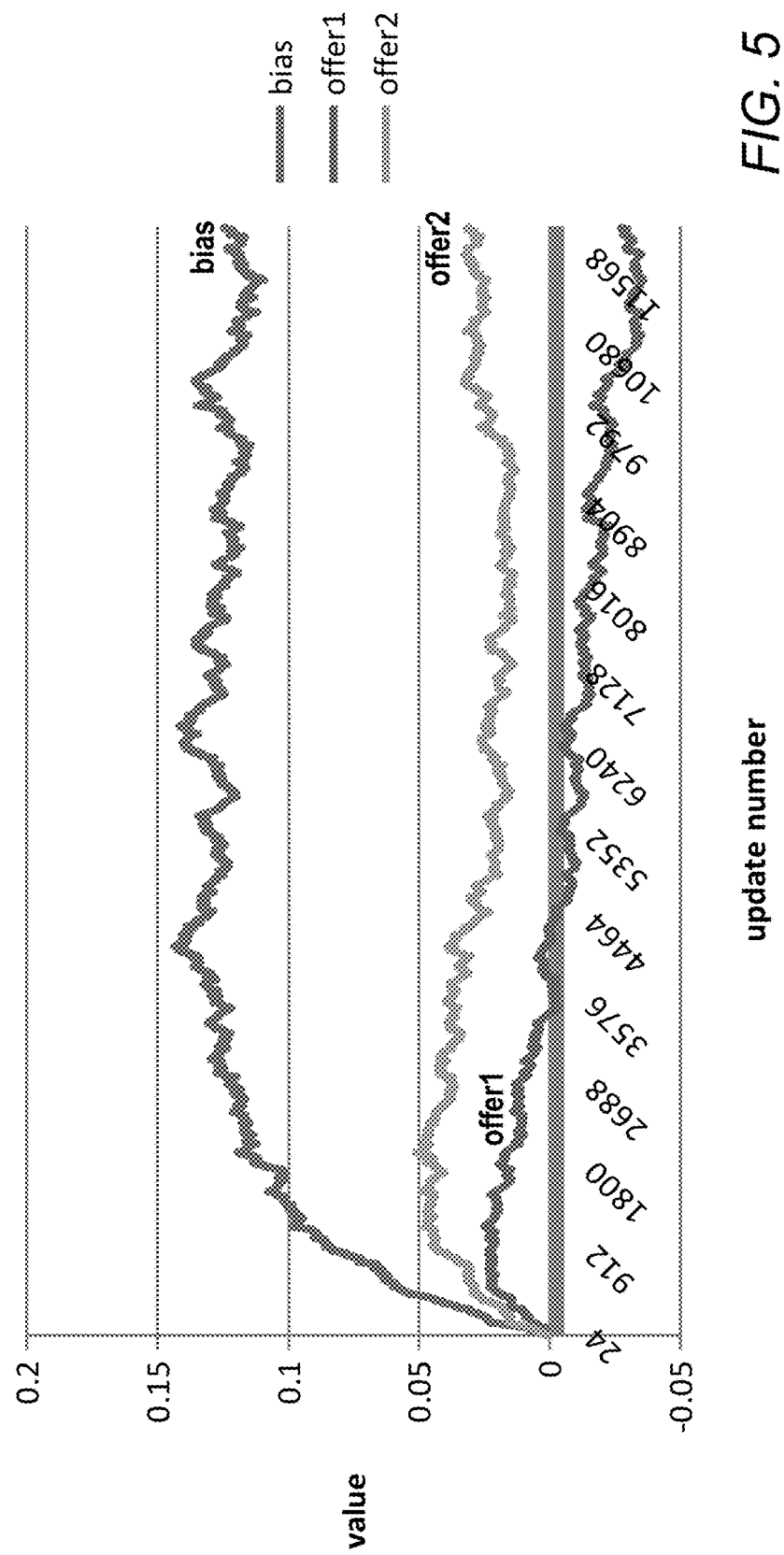
FIG. 5 is a graph showing the convergence of coefficient values for a two-stage update function with a scenario of one coefficient per offer, according to some embodiments of the invention.

Simulation results using methods according to some embodiments of the invention are shown in FIGS. 4 and 5. A simple scenario was created with just two offers and one weight per offer. In this scenario the reward was calculated in terms of response rate. A simulation was run with offer 1 having a response rate of 0.1 and offer 2 having a response rate of 0.15. Equal numbers of each offer were served.

Results for a one-stage update process are presented in FIG. 4. Note the offer 1 line converges to 0.15, and the offer 2 line to 0.1.

FIG. 5 shows convergence for a two-stage update function according to embodiments of the invention. Note that the bias absorbs all of the common signal. The bias should converge to the mean of the two response rates, i.e., 0.125, which it does. The offer 1 and offer 2 lines converge on −0.025 and +0.025, respectively. It should be noted that the bias line converges more quickly than either of the lines shown in FIG. 4. The bias line also converges more quickly than either of the lines for the offers shown in FIG. 5 since the bias line is based on twice as much data as either of the offer lines, i.e., the sum of all the offer data.

Figure 6A:
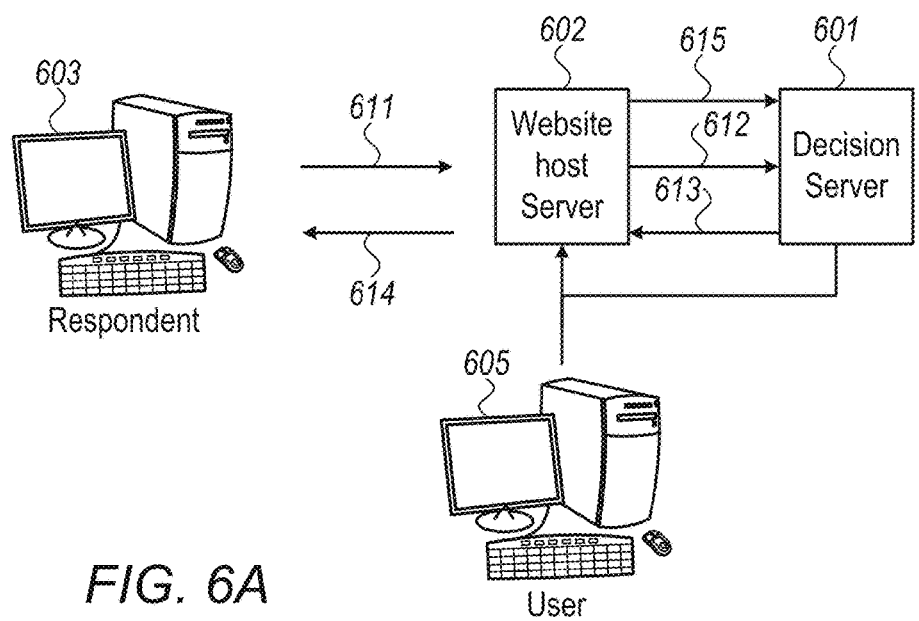
FIGS. 6A and 6B are schematic diagrams showing basic components of two alternative systems according to some embodiments of the invention.
Figure 6B:
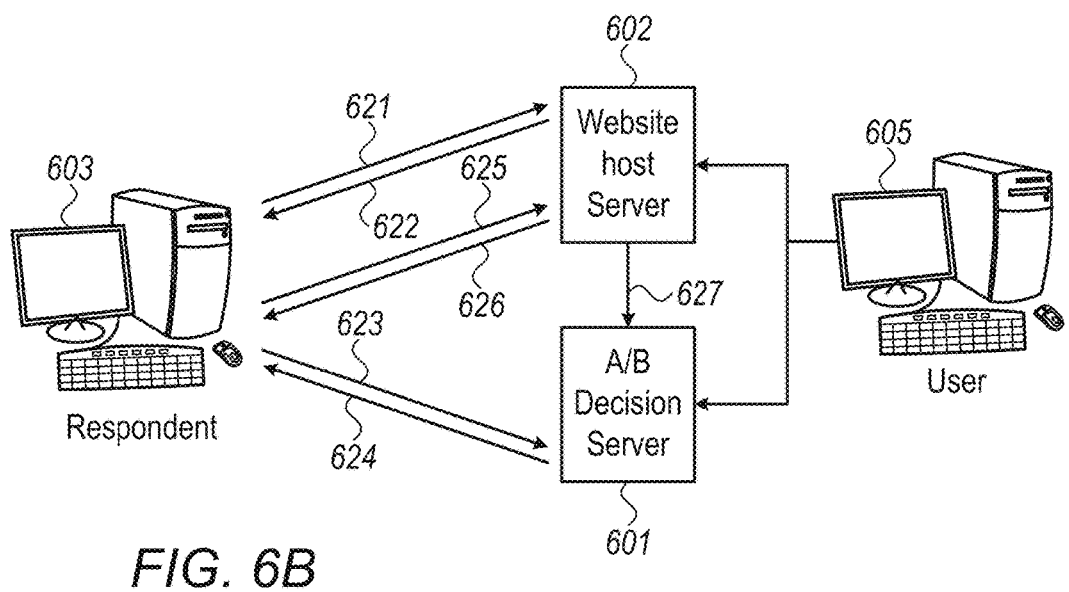

FIGS. 6A and 6B are schematic diagrams showing basic components of two alternative systems, according to some embodiments of the invention. Any of these components may include the computing system, or variations or parts of the computing system, shown in FIG. 12. Each of the systems shown in FIGS. 6A and 6B comprises a decision server 601, a website host server 602 and a respondent device 603 which in this example is shown as a personal computer. It should be noted that the servers 601 and 602 need not be physically separate or self-contained components. They could be virtual servers or services on shared servers. The components of the systems shown in FIGS. 6A and 6B may communicate with each other in any way including wired and wireless connections over one or more local, wide area or global networks. A user of the system such as the owner of the website may have access to the website host server 602, for example remote access via a user device 605 such as a personal computer, and may use this to perform tasks such as updating of information on a website. The same user may have access to the decision server 601. In other embodiments of the invention, the web host server 602 may be replaced by a call centre server. In the case of a call center, the respondent device may be equipment used by the call center agent who records the response of the respondent during a telephone call. It should also be noted that a decision server such as server 601 may serve multiple web host servers or call centre servers or both, and therefore a system according to some embodiments of the invention may include one or more decision servers each serving one or more other servers. Also, a single user may require the services of more than one decision server, e.g., for a complex website it is possible that different parts may be served by different decision servers. Furthermore, according to some embodiments of the invention, the functions of any two or more of the system components shown in FIGS. 6A and 6B may be combined into one computing device or spread across more computing devices according to specific system requirements.

Figure 12:
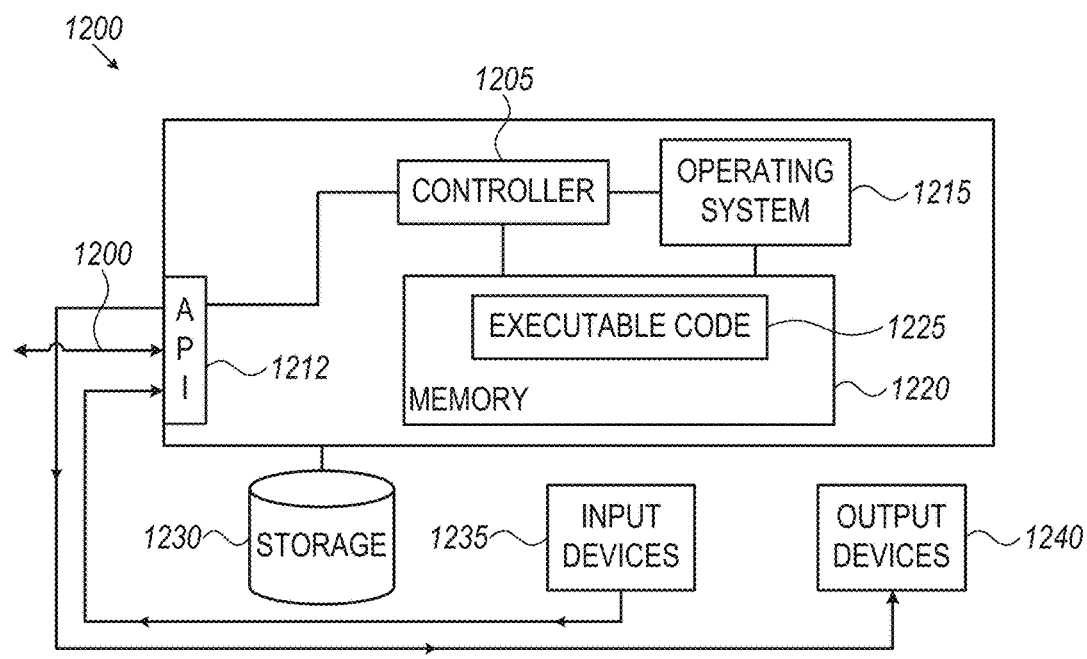
FIG. 12 is a schematic diagram of components of a computing device that may form a computing system, e.g. a decision server, according to some embodiments of the invention.

Each of the servers 601 and 602 and the respondent and user devices 603 and 605 may comprise computing devices comprising one or more processors. An example of a suitable computing device is illustrated in FIG. 12.

FIG. 7 is a screen shot such as might be presented to a user at user device 605 during the set-up or configuration of a product promotion, for example via a user interface "UI". In the screenshot, a decisioning system configuration has been loaded by a user with five offers, and these offers have all been assigned to one location. A user may configure a system according to some embodiments of the invention using an application programming interface "API" running on user device 605. An offer may be very simple and consist of a text string, or a more complex object such as an image, which will inform a calling application what to display to the respondent. The offer may be an HTML or JSON fragment, possibly containing a URL, pointing to an image. The location is the place where these offers are to be displayed. It may be an area of a web page, a desktop application in a call centre, a cashier's till at the point of sale in a retail store, or many other places.

A success criterion or goal may also be defined by a user so that the system can measure the success of each offer. The success criterion or goal may define the reward. This could be click through, product acquisition, revenue spent, or any other metric of interest. Whatever it is, whenever a respondent performs the behavior leading to the success criterion or goal, the decision server should receive this information to improve the accuracy of its predictions. The goal is determined by a user configuring the system.

For some embodiments of the invention, for example depending on how the success criterion is defined, it may be desirable to configure a drop off time. This is the time the system needs to wait to receive an estimated 95% (or other suitable maximum percentage) of any response generated by the offer's display or other serving of an offer. For example, this may be set to 7 days for an e-commerce site for small to medium purchases. This configuration will generally be a guess and does not need to be accurate. It may be used as a starting point and the system will learn away from this if it is not accurate.

In the example of FIG. 7, the screen shot shows that five offers have been loaded to the decision server 601, denoted OPTION 01-OPTION 05, to be displayed at a location denoted LOC 100. It should be noted that these may be loaded to either server 601 or 602. During operation, the decision server 601 will receive requests for a decision as to which one of a set of offers is to be displayed. In other words the decision server is requested to select an offer for the next serve. The requests may come from a variety of sources depending on the nature of the offers. They may, for example, come from applications, running for example on respondent devices, referred to as calling applications. The offer may be very simple and comprise for example a text string instruction to a calling application, such as a universal resource locator "URL" pointing to an image.

FIGS. 6A and 6B are two system diagrams showing the interaction of a decision server with a user and a respondent according to embodiments of the invention. Two modes of operation are illustrated. In FIG. 6A, the request for an offer comes from the website content management system. In FIG. 6B, it comes from the browser during a page loading process.

Referring to FIG. 6A, possible information flows between the system components according to some embodiments of the invention may be as follows:

611—a browser application running on the respondent device 603 requests a page from a website hosted by website host server 602

612—the website host server 602 sends a request to the decision server 601 for a decision as to which offer to serve

613—in response to the request, the decision server 601 returns a decision to the website host server 602, this may be in the form of a URL identifying a web page

614—in response to receiving the decision, the website host server 602 returns the complete web page selected by the decision server 601 to the browser at the respondent device 603

615—response data is collected by the website host server and fed back to the decision server 601 for use in future decision making.

It should be remembered that flows 613 and 615 may be asynchronous.

In the foregoing example, the content of each offer is stored at the website host server 602 and the decision server 601 simply uses identifiers for each offer. It is also possible, according to some embodiments of the invention, for the content to be stored at the decision server 601.

Referring to FIG. 6B, possible information flows between the system components is as follows, for an example where the offers comprise different variations of the same webpage:

621—a browser application running on the respondent device 603 requests a page from a website hosted by website host server 602

622—website host server 602 returns the page with an embedded tag identifying a variable part of the page

623—when the page renders the tag signals the browser at respondent device 603 to request the decision for a decision as to which offer to serve

624—in response to the request, the decision server 601 returns an offer decision to the respondent device 603 This may be the actual content displayed or a reference to the actual content

625—if the respondent device 603 has received a reference to the actual content, it sends a request back to the website host server 602 for the content to display in the variable part of the page

626—in response to a request from the respondent device 603, the website host server 602 returns the content so that the complete page can be rendered by the browser on the respondent device 603

627—response data is collected by the website host server 602 and fed back to the decision server 601 for use in future decision making.

The response data is used to determine an actual reward. The determination of the actual reward resulting from the serving of an offer (or, for example if the reward is response rate, multiple serves of the offer) may be performed at the website host server 602, the decision server 601 or elsewhere. According to some embodiments of the invention, the reward is reported as a notification to a decisioning platform within the decision server 601.

It should be noted that, from the point of view of the respondent or other operator of respondent device 603, such as a call center agent, the communication between the website host server 602 and the decision server 601 is invisible, and the respondent or call center agent, for example, may not be aware that this is happening.

In brief, respondents have various offers displayed to them as they interact with some third party application. Whether or not they interact with this content (e.g., click through, go on to acquire something, or whatever the optimisation goal is) this is recorded and notified to the decision server 601. A system according to some embodiments of the invention may learn that one offer is more successful than the rest in terms of reward for a particular group of respondents, and this offer will then be preferentially served to this group in future. Therefore, future respondents, or the same respondents coming back, should generate improved rewards. This invention aims to provide greater rewards from respondents more quickly and in a more reliable way.

A suitable architecture for a system according to some embodiments of the invention will now be described in more detail.

Figure 8:
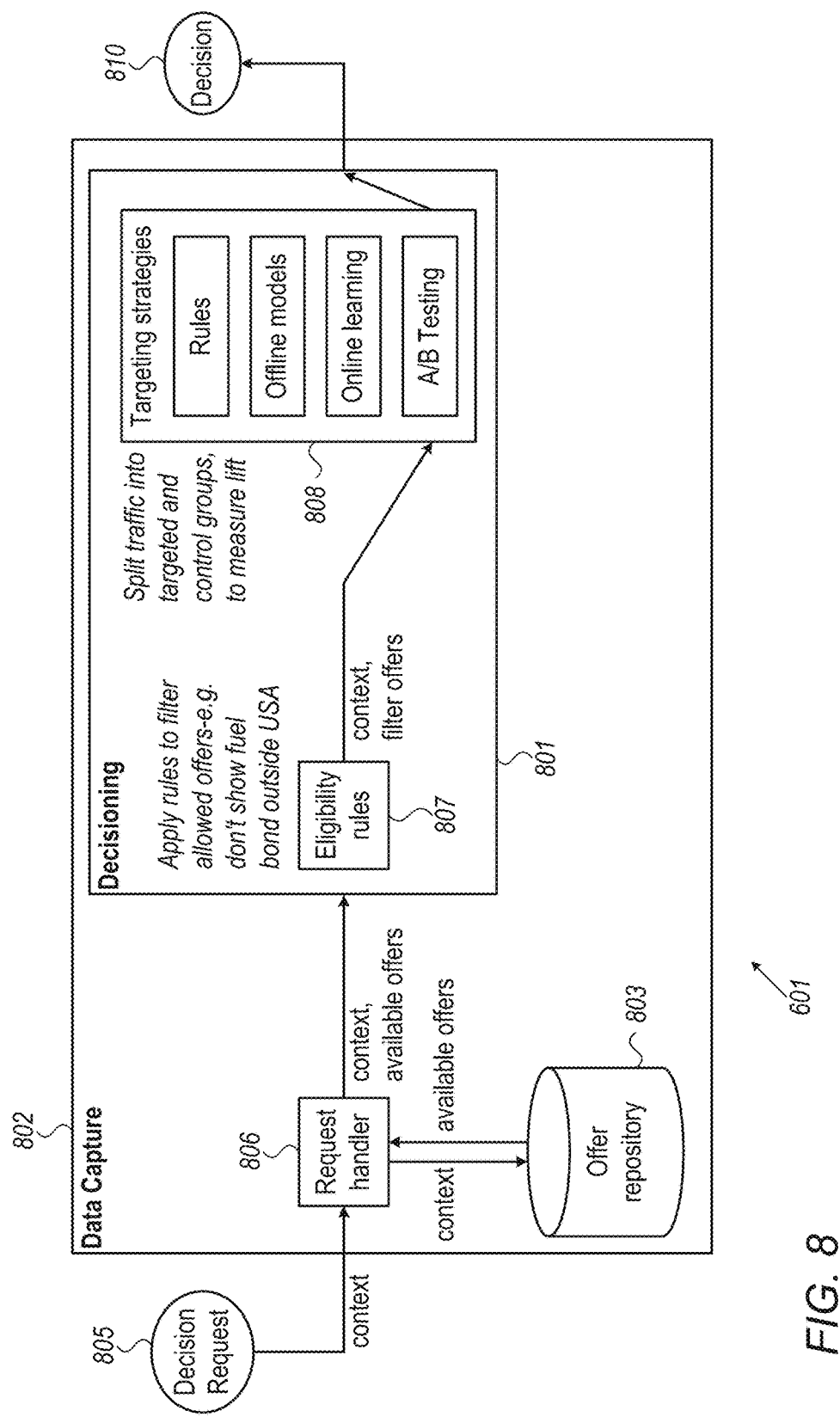
FIG. 8 is a schematic diagram showing components of a decision server according to some embodiments of the invention.

FIG. 8 is a diagram showing high level components that may be included in a decision server 601 according to embodiments of the invention. These include a decisioning platform 801 that operates within a data capture platform 802. Each platform 801, 802, comprises software operating on one or more processors or hardware comprising one or more processors or a combination of hardware and software defining an operating environment in which other platforms or applications may operate. For example, the decisioning platform 801 according to some embodiments is a platform within which a plurality of different applications may operate, including an offer selection application. Thus, the decisioning platform 801 may be configured for many decision making scenarios other than offer selection which are not described herein. The platforms 801 and 802 may for example be implemented as executable code stored in memory 1220 of a computing system as shown in FIG. 12 to be executed by one or more processors, for example in controller 1205.

The decisioning platform 801 listens for requests for a selection of an offer from a set of offers, or Decision Requests. Decision Requests 805 may be received for example from a website host server such as server 602 or a respondent device such as device 603 as shown in FIG. 6. Decision Requests 805 may be received via an API—and may contain a location. This may be different from the location that is used in the configuration by a user and may for example be a geographical location. This location is referred to as the "context". Decision Requests 805 are received by a request handler 806 which in the embodiment illustrated in FIG. 8 is part of the data capture platform 802. The request handler 806 may then use the context, if provided, to retrieve all eligible offers for that context. In the example of FIG. 8, according to some embodiments of the invention, the offers may be stored in an offer repository 803 which may be part of the data capture platform 802. Offer repository 803 may store only identifiers for multiple offers. These may be stored in sets, each set corresponding to a location as defined during configuration by a user. Thus, each set may comprise a plurality of alternative offers for a particular location. The retrieved offers are then supplied to an eligibility rules filter 807 which may be part of the decisioning platform 801. The retrieved offers may then be then filtered by eligibility rules. For example, there may be restrictions on what offers are available for users in different geographical locations (contexts). An example of such a restriction is a requirement not to display alcohol advertisements in certain US states.

According to some embodiments of the invention, the decision request 805 may include a value for one or more variables characterizing the respondent. These may be used to calculate a predicted reward for each offer and the prediction may be used in the selection of an offer to be served to the respondent. According to other embodiments of the invention, the decision request 805 may simply identify the respondent and values for variables characterizing the respondent may be retrieved from a database, for example at decision server 601.

A targeting strategy may then be applied to the set of filtered offers, for example using one or more targeting applications. This may be applied in a targeting strategy module 1008 which is comprised in the decisioning platform 801. There are several available strategies and corresponding modules illustrated in FIG. 8 including rules, offline models, online learning and A/B testing. Each module may run a specific application. According to some embodiments of the invention, a set of offers, which may be filtered, is received and one of these is selected to be served using one or more of the applications. Once a selection has been made, e.g., an offer has been chosen, a decision 810 such as an offer or an identification of an offer may output, for example from the data capture platform 802. The decision 810 may be in the form of a signal identifying the selected offer to cause the selected offer to be presented to a respondent. The chosen offer may then be returned, for example to a calling application running on a respondent device 603, either directly or via a website host server for example according to the flows of FIG. 6A or 6B. The offer may then be displayed or otherwise presented to the respondent.

Figure 9:
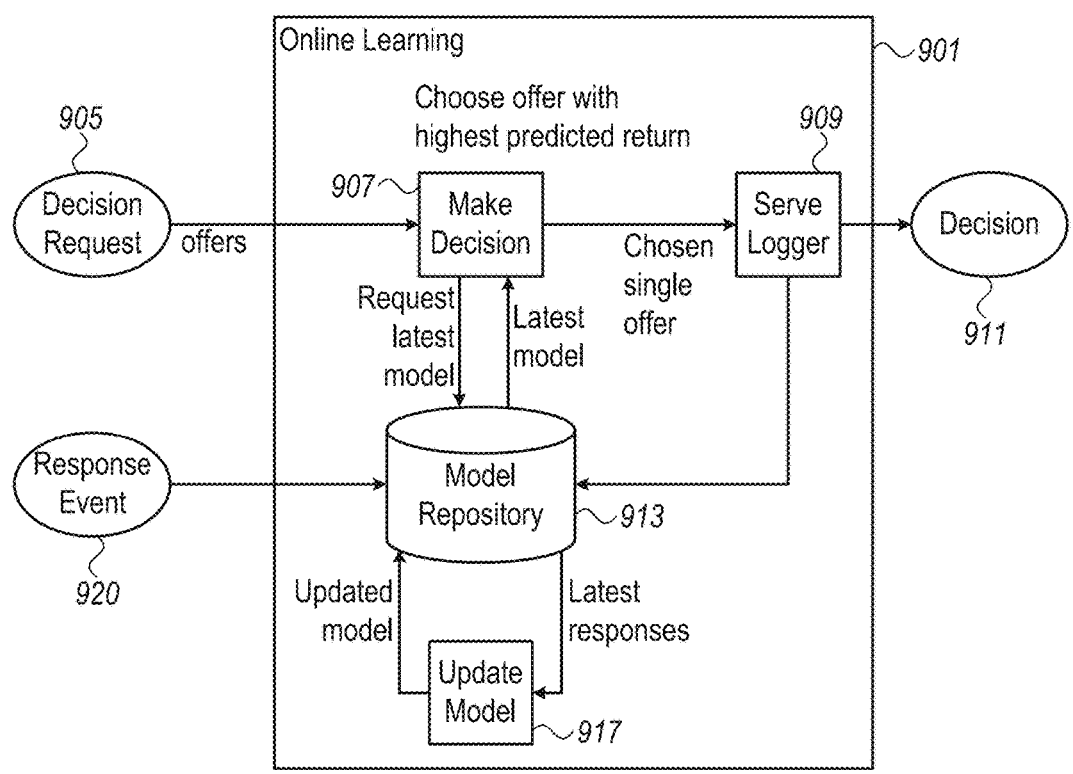
FIG. 9 is a schematic diagram showing components of an automated decision module according to some embodiments of the invention.

FIG. 9 schematically illustrates an online learning module 901 which may form part of the targeting strategy module 808. The online learning module receives a request for a selection of an offer from a set of offers, e.g., a decision request 905, which may be the decision request 805 of FIG. 8 after filtering using eligibility rules 807. The request 905 may comprise a set of offers and values for one or more variables characterizing the customer, for example in a customer profile. The values for the variables may have been supplied as part of the request 805 or they may have been retrieved from the website host server 602 or the decision server 601 or elsewhere, depending on where the customer profiles or other respondent data is stored. A predicted reward is calculated for each offer in the set of offers. For example, all of the offers comprised in the request 905 may be scored against the values for the one or more variables, for example variables contained in the profile, where each score is a prediction of the expected future reward from that particular offer being shown to the current customer. The scores are generated using the mathematical model that is being continually updated, for example using a process described with reference to FIG. 10. The calculated predicted rewards are used to select which offer to be served to a respondent. For example, the offer with the highest score may be chosen. The scoring and selection of an offer may be performed in the "Make Decision" module 907. Following the decision, an "impression", e.g., an instance of serving the offer, is logged in a serve logger 909 for the chosen offer. A signal identifying the selected offer is output to cause the selected offer to be served to a respondent. This is shown in FIG. 9 as the decision 911 being returned in response to the request.

Independently, positive response events, such as response event 920, may be received by a model repository 913 in which the model used to predict rewards is stored. These response events may come from many places and may depend on the goal and the configuration. Some examples:

If the goal is click-through on a web page, the click-through page could be tagged to automatically send an event to a decision server 601, in much the same way as packages like Google Analytics record page-views in real-time.

If the goal is revenue, a client of the decision server 601 (e.g., the company running the website) may send a batch of events every night created from their purchase records.

When responses are received, an Update Model routine runs in update model module 917. In order to do this, the responses may be matched against any relevant offer impressions logged in serve logger 909.

An example of a series of operations that may be performed in order to update a model according to embodiments of the invention will now be described with reference to FIG. 10.

Figure 10:
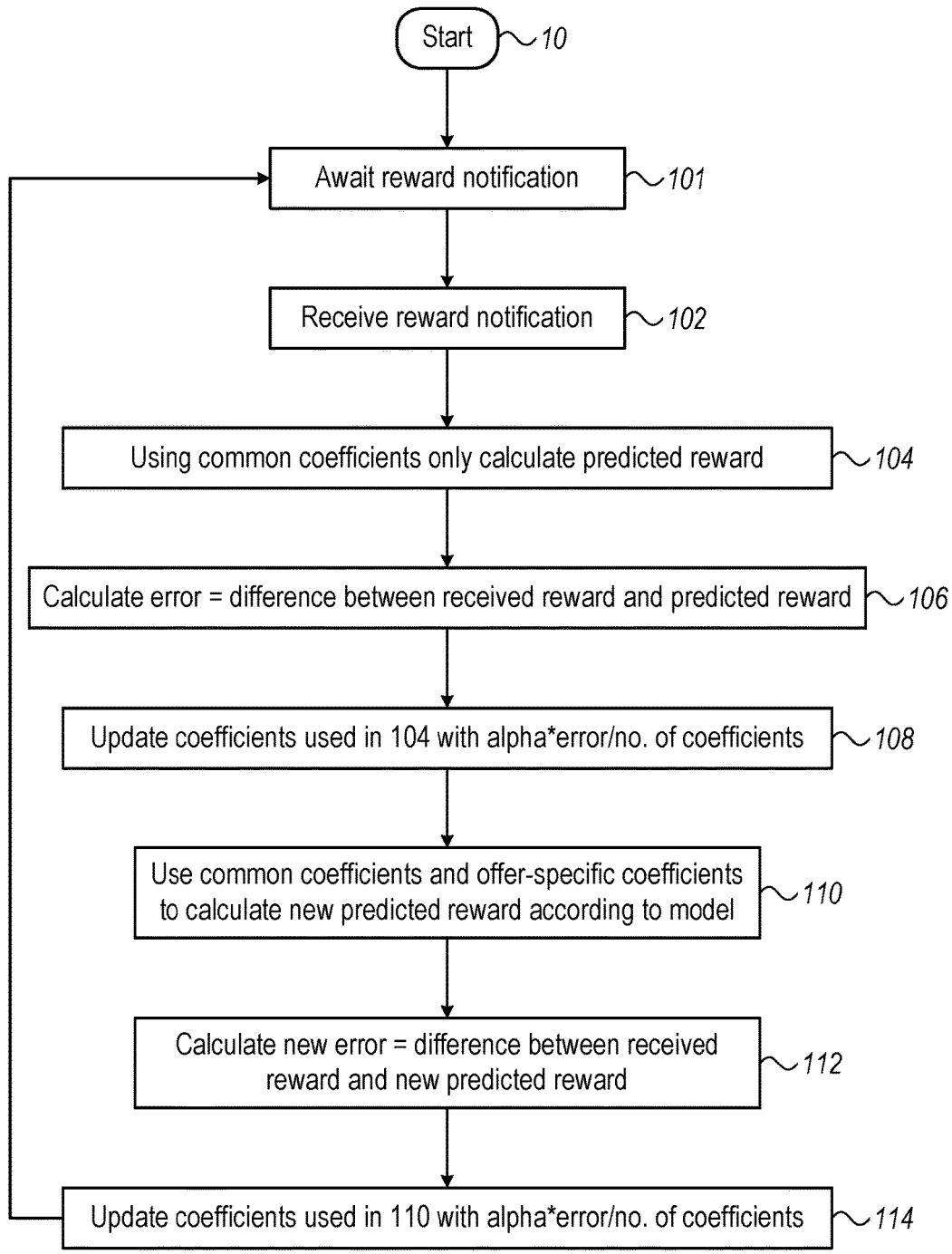
FIG. 10 is a flow chart showing a series of operations that may be performed in a method according to some embodiments of the invention.

At the start 10 of the process shown in FIG. 10, the model may be loaded to module 917 and populated with initial values for coefficients. These could be all set to zero on commencement or values could be provided with a view to having the model produce more accurate results more quickly. The model will include one or more variables characterizing the respondent, a set of offer-specific coefficients and set of common coefficients which are common to all offers. It should be noted that, according to some embodiments of the invention, there may be only one variable. The set of common coefficients may include a coefficient for every value or bin of every variable. Variables may have set ranges, for example age ranges in ten-year span bins, in which case not all possible values of variables are available. Thus, the set of common coefficients will be limited in number to one for every available value of a variable. The set of offer-specific coefficients may include a coefficient for every value-variable-offer combination. An "other" or ">x" bin may be provided to accommodate all possible values. An additional bin may be reserved for missing values, for example in case the actual value was not provided, e.g. age: {Missing, <10,10-20,20-40,>40}. Binning is a standard process for many modelling techniques.

Following initialization at operation 10, a reward notification is awaited at operation 101. It should be noted here that a reward notification can be a notification of the absence of a reward. Thus, for example, at the drop-off time the reward received up to that point in time may be zero, and an update to the model may be performed. Thus, the process of FIG. 10 may run in response to a negative reward notification.

At operation 102, a reward notification is received. The reward may be a response event, such as the logging of a click-through on a web page.

At operation 104, a predicted reward is calculated, for example in response to a reward notification at operation 102. This may involve matching the reward to a logged event in order to determine the variables and corresponding values to use in the prediction. Alternatively, the reward notification may include this information. The calculation of predicted reward at operation 104 uses only coefficients from the set of common coefficients, for example a selection of the common coefficients applicable to the reward notification. If there is only one variable, then only one coefficient will be used in operation 104. It will be appreciated that the predicted reward calculated at operation 104 will reflect only respondent behavior that is common to all offers and, as such, may be representative of the Sure Things.

At operation 106, the difference between the received reward (from operation 102) and the predicted reward (from operation 104) is calculated. The result of this calculation is an indication of an error in the calculation of the predicted reward.

At operation 108, a first update operation takes place comprising updating, for example incrementing, at least one common coefficient from the set of common coefficients, for example the one or more common coefficients used in operation 104. In the case of the reward being a single click-through or an individual purchase of a product, the updated coefficients will be the coefficients applicable to the respondent that generated the reward. The amount of updating of the coefficients in this operation according to some embodiments of the invention depends on the difference or error calculated in operation 106. As discussed in connection with FIG. 5, the one or more coefficients to be updated are incremented by a fraction, called alpha in FIG. 10, of the calculated error, the fraction being known as the learning rate. According to some embodiments, this fraction is shared amongst the coefficients to be updated so that the greater the number of coefficients to be updated, the smaller the increment will be.

At operation 110, a new predicted reward is calculated using both common coefficients and offer-specific coefficients. It should be noted that, according to some embodiments of the invention, common coefficients that have already been updated, as well as offer-specific coefficients that were not used in operation 104, are used in this calculation.

At operation 112, a new error is calculated being the difference between the received reward and the new predicted reward calculated at operation 110.

At operation 114, a second update operation takes place in which at least one offer-specific coefficient is updated by an amount that depends on at least one updated common coefficient from operation 110. For example, this second update operation may comprise updating, e.g., incrementing, at least one offer-specific coefficient by an amount that depends on the difference between the new predicted reward and the received reward, which in turn depends on at least one updated common coefficient that is used to determine the new error in operation 110.

This second update operation 114 may comprise updating or incrementing not only offer-specific coefficients that have not yet been updated in response to the reward notification but also the common coefficients that have already been updated at operation 108.

Following operation 114, the process returns to operation 101 to await a further reward notification.

It will be appreciated that the operations shown in FIG. 10 may be part of what is known as a machine-learning process in which the model is trained by results achieved. The operations 104-114 of FIG. 10 may comprise one iteration of the process, with each iteration taking place in response to a reward notification at operation 102. Thus, according to some embodiments of the invention, the common coefficients are updated, e.g., incremented, more than once at each iteration. Alternatively, according to some embodiments of the invention, operations 104-114 may be performed in response to a selection of reward notifications, for example to save on processing requirements. According to some embodiments of the invention, the first update operation may be performed in response to a reward notification and the second update operation may be performed in response to a subsequent reward notification.

According to the embodiment described with reference to FIG. 10, a two stage update operation takes place with common coefficients being incremented in a first update operation and offer-specific coefficients being incremented in a second update operation. It will be appreciated that the principles of the methods described with reference to FIG. 10 may be extended to more than two stages, for example where there are additional levels of commonality. For example, it may be possible to identify respondent behaviors that are common to a set of variable-value-offer combinations and to update the corresponding coefficients in an intermediate update operation. Thus, some embodiments of the invention are not limited to two stage model update processes to update all of the coefficients used to predict a particular reward, and may include additional update stages.

Figure 11:
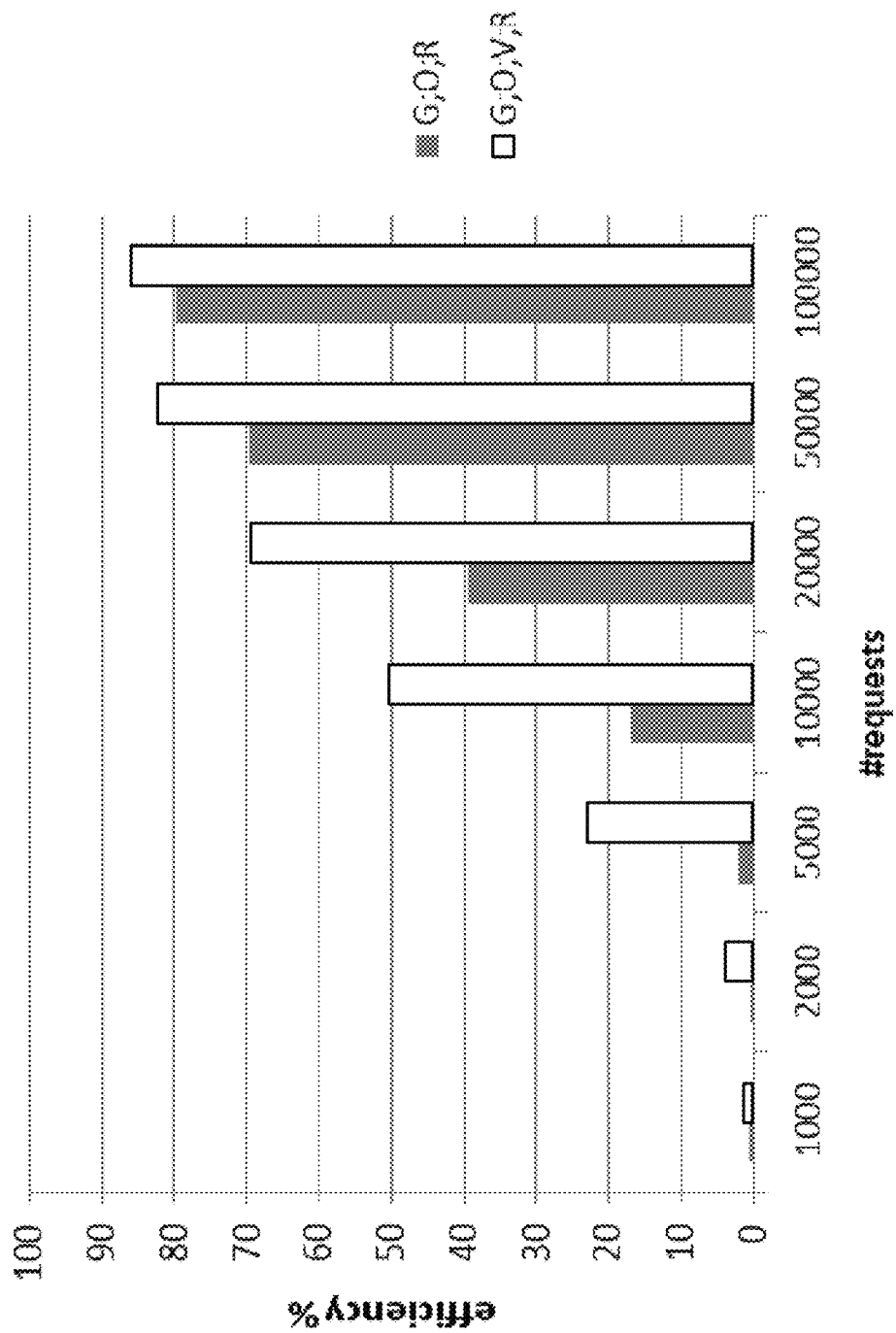
FIG. 11 is a graph showing efficiency versus time comparing one-stage and two-stage model update methods according to some embodiments of the invention.

FIG. 11 is a graph showing efficiency against time with and without the use of common coefficients (variable-bin biases) and the two-stage update. The bars labelled G;O;V;R show the performance of the variable-bin biases and the two-stage update at various stages through the simulation. The data used simulated 100,000 customers visiting a website over a period of 28 days. There were three offers and the system needed to learn which offers to target to which customers. There were two learning configurations:

Standard response model. Here one model is built per offer and the update function is the standard single stage update. This is denoted by G;O;R in FIG. 11.

New representation with two-stage update function. This is denoted by G;O;V;R in FIG. 11.

The y-axis shows efficiency of learning for a set of simulated visitors called PersType17. Efficiency is defined so that, if offers are chosen at random, efficiency equals 0%. If the best possible choice is made for every customer, then efficiency equals 100%.

The results show the two-stage update function producing superior efficiencies at each stage of the test. At the beginning of the test, the advantage of using the two-stage update is greatest meaning that the system can both show a return on investment (ROI) for a client, e.g., website owner, at an earlier stage and respond more rapidly to change in the environment.

Reference is made to FIG. 12 showing a high level block diagram of an exemplary computing system 1200 according to some embodiments of the present invention, for example for use in systems according to embodiments of the invention. For example, decision server 601 or other computing devices carrying out all or part of some embodiments of the present invention may include components such as those included in computing system 1200. Computing system 1200 may comprise a single computing device or components, and functions of system 1200 may be distributed across multiple computing devices. Computing system 1200 may include one or more controllers such as controller 1205 that may be, for example, a central processing unit processor (CPU), a chip or any suitable processor or computing or computational device, an operating system 1215, a memory 1220, a storage 1230, input devices 1235 and an output devices 1240. For example, server 601 may include one or more controllers similar to controller 1205, server 601 may include one or more memory units similar to memory 1220, and server 601 may include one or more executable code segments similar to executable code 1225. One or more processors in one or more controllers such as controller 1205 may be configured to carry out methods according to some embodiments of the invention. For example, one or more processors within controller 1205 may be connected to memory 1220 storing software or instructions that, when executed by the one or more processors, cause the one or more processors to carry out a method according to some embodiments of the present invention. Controller 1205 or a central processing unit within controller 1205 may be configured, for example, using instructions stored in memory 1220, to perform the operations shown in FIG. 10. The platforms 802 and 803 of FIG. 8 may be implemented as executable code stored in memory 1220 to be executed by one or more processors, for example in controller 1205.

Operating system 1215 may be or may include any code segment designed and/or configured to perform tasks involving coordination, scheduling, arbitration, supervising, controlling or otherwise managing operation of computing system 1200, for example, scheduling execution of programs. Operating system 1215 may be a commercial operating system. Memory 1220 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. In one embodiment, memory 1220 is a non-transitory processor-readable storage medium that stores instructions and the instructions are executed by controller 1205. Memory 1220 may be or may include a plurality of, possibly different memory units.

Executable code 1225 may be any executable code, e.g., an application, a program, a process, task or script. Executable code 1225 may be executed by controller 1205 possibly under control of operating system 1215. Executable code 1225 may comprise code for selecting an offer to be served and calculating reward predictions according to some embodiments of the invention.

In some embodiments, more than one computing system 1200 may be used. For example, a plurality of computing devices that include components similar to those included in computing system 1200 may be connected to a network and used as a system.

Storage 1230 may be or may include one or more storage components, for example, a hard disk drive, a Compact Disk (CD) drive, a CD-Recordable (CD-R) drive, a universal serial bus (USB) device or other suitable removable and/or fixed storage unit. For example, memory 1220 may be a non-volatile memory having the storage capacity of storage 1230. Accordingly, although shown as a separate component, storage 1230 may be embedded or included in memory 1220. Storage 1230 or memory 1220 may store identifiers of or content of offers, and may thus serve the function of offer repository 803 shown in FIG. 8. They may also be used to store impression and response data and may serve the function of server logger 909 shown in FIG. 9.

Input to and output from a computing system according to some embodiments of the invention may be via an API, such as API 1212 shown in FIG. 12. The API 1212 shown in FIG. 12 operates under the control of the controller 1205 executing instructions stored in memory 1220. Input to and output from the system via the API may be via input/output port 1213. Input may comprise decision requests 1105, for example from respondent device 603 or website host server 601. Output may comprise an offer selection. This may be in the form of a signal that causes a selected offer to be presented to a respondent. The signal may identify the offer and it may also comprise the content of the offer, such as one or more of text, graphical information (including video) and audio information.

The decision server 601 may include user input devices. Input devices 1235 may be or may include a mouse, a keyboard, a touch screen or pad or any suitable input device. It will be recognized that any suitable number of input devices may be operatively connected to computing system 1200 as shown by block 1235.

The decision server may include one or more output devices. Output devices 1240 may include one or more displays, speakers and/or any other suitable output devices. It will be recognized that any suitable number of output devices may be operatively connected to computing system 1200 as shown by block 1240. Any applicable input/output (I/O) devices may be connected to computing system 1200 as shown by blocks 1235 and 1240. For example, a wired or wireless network interface card (NIC), a modem, printer or a universal serial bus (USB) device or external hard drive may be included in input devices 1235 and/or output devices 1240.

Input devices 1235 and output devices 1240 are shown as providing input to the system 1200 via the API 1912 for the purpose of embodiments of the invention. For the performance of other functions carried out by system 1200, input devices 1235 and output devices 1240 may provide input to or receive output from other parts of the system 1200.

Alternatively, all output from the decision server 601 may be to a remote device such as user device 805 in which case the output devices may be replaced by a data port.

Some embodiments of the invention may include computer readable medium or an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, some embodiments of the invention may comprise a storage medium such as memory 1220, computer-executable instructions such as executable code 1225 and a controller such as controller 1905.

A system according to some embodiments of the invention may include components such as, but not limited to, a plurality of central processing units (CPU), e.g., similar to controller 1205, or any other suitable multi-purpose or specific processors or controllers, a plurality of input units, a plurality of output units, a plurality of memory units, and a plurality of storage units. An embodiment of system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art.

The invention claimed is:

1. A method of predicting a reward resulting from serving an offer to one or more potential respondents on a screen operated by a user computing device comprising a processor and corresponding to a respondent, the method performed by:
receiving at a website host server operating a processor a request for a web page from the user computing device;
receiving at a decision server operating a processor a request for a selection of an offer from a set of offers stored in an offer repository;
the decision server calculating a predicted reward according to a model, the model comprising:
one or more variables characterizing the respondent;
for each offer, a set of offer-specific coefficients, the offer-specific coefficients comprising at least one coefficient for each of the one or more variables; and
a set of common coefficients comprising at least one coefficient for each of said one or more variables, each coefficient of said set of common coefficients being common to all of said offers,
by, for each offer, using the offer-specific coefficients for the offer which correspond to the variables characterizing the respondent and the common coefficients which correspond to the variables characterizing the respondent;
using at the decision server the calculated predicted rewards to select which offer of the set of offers to serve; and
serving, using the one or more processors, the one of the set of offers to the one or more potential respondents on a web page on the screen.

2. The method of claim 1 further comprising training the model at the one or more processors by:
receiving a notification of a received reward;
calculating a predicted reward using the model;
calculating the difference between the received reward and the predicted reward;
in a first update operation updating at least one common coefficient from the set of common coefficients by an amount depending on the difference; and
in a second update operation updating at least one offer-specific coefficient by an amount that depends on the at least one updated common coefficient.

3. The method of claim 2 wherein the calculation of the predicted reward uses only one or more coefficients from said set of common coefficients.

4. The method of claim 2 wherein the training further comprises:
calculating a new predicted reward after the first update operation and before the second update operation using at least one updated common coefficient from the first update operation; and
calculating the difference between the new predicted reward and the received reward;
wherein the second update operation comprises updating at least one offer-specific coefficient by an amount that depends on the difference between the new predicted reward and the received reward.

5. The method of claim 4 wherein the second update operation additionally comprises updating at least one common coefficient from the set of common coefficients by an amount that depends on the difference between the new predicted reward and the received reward.

6. A method of selecting an offer to be served on a screen operated by a user computing device comprising a processor and corresponding to a respondent, the method performed using one or more processors in a computing system, wherein the method of selecting comprises:
receiving at a website host server operating a processor a request for a web page from the user computing device;
receiving at a decision server operating a processor a request for a selection of an offer from a set of offers stored in an offer repository;
using at the decision server a model, the model comprising:
one or more variables characterizing the respondent;
for each offer, a set of offer-specific coefficients, the offer-specific coefficients comprising at least one coefficient for each of the one or more variables; and
a set of common coefficients comprising at least one coefficient for each of said one or more variables, each coefficient of said set of common coefficients being common to all of said offers,
to calculate for each offer of the set of offers a predicted reward by, for each offer, using the offer-specific coefficients for the offer which correspond to the variables characterizing the respondent and the common coefficients which correspond to the variables characterizing the respondent;

using at the decision server the calculated predicted rewards to select which offer of the set of offers to serve; and outputting the selected offer to be served to the respondent on a web page on the screen.

7. The method of claim 6 wherein the selected offer is the offer of the set of offers for which the predicted reward is largest.

8. The method of claim 6 further comprising training the model at the one or more processors by:
receiving a notification of a received reward;
calculating a predicted reward using the model;
calculating the difference between the received reward and the predicted reward;
in a first update operation updating at least one common coefficient from the set of common coefficients by an amount depending on the difference; and
in a second update operation updating at least one offer-specific coefficient by an amount that depends on the at least one updated common coefficient.

9. The method of claim 8 wherein the calculation of the predicted reward uses only one or more coefficients from said set of common coefficients.

10. The method of claim 9 wherein the training further comprises:
calculating a new predicted reward after the first update operation and before the second update operation using at least one updated common coefficient from the first update operation; and
calculating the difference between the new predicted reward and the received reward;
wherein the second update operation comprises updating at least one offer-specific coefficient by an amount that depends on the difference between the new predicted reward and the received reward.

11. The method of claim 10 wherein the second update operation additionally comprises updating at least one common coefficient from the set of common coefficients by an amount that depends on the difference between the new predicted reward and the received reward.

12. A system for determining which offer of a set of offers stored in an offer repository to serve to a respondent on a screen operated by a user computing device comprising a processor and corresponding to a respondent, the system comprising one or more processors configured to:
receive at a website host server operating a processor a request for a web page from the user computing device;
receive at a decision server operating a processor a request for a selection of an offer from the set of offers;
use at the decision server a model, the model comprising:
one or more variables characterizing the respondent;
for each offer, a set of offer-specific coefficients, the offer-specific coefficients comprising at least one coefficient for each of the one or more variables; and
a set of common coefficients comprising at least one coefficient for each of said one or more variables, each coefficient of said set of common coefficients being common to all of said offers,
to calculate for each offer of the set of offers a predicted reward by, for each offer, using the offer-specific coefficients for the offer which correspond to the variables characterizing the respondent and the common coefficients which correspond to the variables characterizing the respondent;
use at the decision server the calculated predicted reward to select which offer of the set of offers to serve; and
output the selected offer to be presented to the respondent on a web page on the screen.

13. The system of claim 12 further comprising training the model at the one or more processors by:
receiving a notification of a received reward;
calculating a predicted reward using the model;
calculating the difference between the received reward and the predicted reward;
in a first update operation updating at least one common coefficient from the set of common coefficients by an amount depending on the difference; and
in a second update operation updating at least one offer-specific coefficient by an amount that depends on the at least one updated common coefficient.

14. The system of claim 13 wherein the calculation of the predicted reward uses only one or more coefficients from said set of common coefficients.

15. The system of claim 13 wherein the training further comprises:
calculating a new predicted reward after the first update operation and before the second update operation using at least one updated common coefficient from the first update operation; and
calculating the difference between the new predicted reward and the received reward;
wherein the second update operation comprises updating at least one offer-specific coefficient by an amount that depends on the difference between the new predicted reward and the received reward.

16. The system of claim 15 wherein the second update operation additionally comprises updating at least one common coefficient from the set of common coefficients by an amount that depends on the difference between the new predicted reward and the received reward.

* * * * *